United States Patent
Lucas et al.

[15] 3,664,268
[45] May 23, 1972

[54] SYSTEM FOR AND METHOD OF LEVITATING VEHICLES IN A GROUND TRANSPORTATION SYSTEM

[72] Inventors: Edward J. Lucas, Wayland, Mass.; Jean C. Lafrance, Vienna, Va.

[73] Assignee: Avco Corporation, Cincinnati, Ohio

[22] Filed: Dec. 15, 1969

[21] Appl. No.: 884,906

[52] U.S. Cl. .................................................. 104/148 SS
[51] Int. Cl. .................. B61b 13/08, H01f 7/00, H02k 41/00
[58] Field of Search .............................. 184/148 MS; 191/10

[56] References Cited

UNITED STATES PATENTS 3,470,828  10/1969  Powell, Jr. et al. ............... 104/148 MS 874,411  12/1907  LeBlanc .................................. 191/10

OTHER PUBLICATIONS

" The Magnetic Road: A New Form of Transport" by James Powell, ASME publication 63– RR– 4, April, 1963.

Primary Examiner—Arthur L. La Point
Assistant Examiner—George H. Libman
Attorney—Charles M. Hogan and Melvin E. Frederick

[57] ABSTRACT

Apparatus for and a method of levitating vehicles in a ground transportation system wherein the magnetic field of a direct current power transmission line in conjunction with superconductive magnets in the vehicle cooperate to provide levitation of the vehicle. The direct current power transmission line simultaneously functions as part of the levitation system and as part of a conventional electric power distribution system.

2 Claims, 15 Drawing Figures

EDWARD J. LUCAS
JEAN C. LAFRANCE
*INVENTORS*

EDWARD J. LUCAS
JEAN C. LAFRANCE
INVENTORS

BY

ATTORNEYS

_FIG_ 11

_FIG_ 12

_FIG 15_

_FIG 14_

EDWARD J. LUCAS
JEAN C. LAFRANCE
 INVENTORS

BY *Charles M. Hogan*
*Melvin C. Frederick*

ATTORNEYS

SYSTEM FOR AND METHOD OF LEVITATING VEHICLES IN A GROUND TRANSPORTATION SYSTEM

Wheeled vehicles forming part of a ground transportation system and operating on tracks are presently operational up to the 150–200 miles per hour range. Such wheeled vehicles are generally propelled through their wheels and in the speed range of 150–200 miles per hour the propulsion machinery for the vehicle can be electric, gas turbine or internal combustion. In all of these systems the wheels may be driven electrically. The conventional use of electric propulsion implies the use of a pantograph or a third rail to transmit the power to the vehicle. The present state of the art limits the use of a pantograph to speeds below 200 miles per hour and the use of either internal combustion or gas turbine engines as a prime mover carries with it a pollution control problem which becomes severe if the vehicle must operate in tunnels. A simple increase in speed of present configurations up to about the 300 miles per hour range is not possible without changes in the state of the art of both propulsion and suspension. The use of superconducting components in accordance with the invention provides improved performance compared to conventional devices.

Accordingly, it is an object of the present invention to provide a magnetic levitation system using the magnetic field around current-carrying rails.

A further object of the present invention is the provision of a levitation system for vehicles that is independent of power pickup for levitation power.

A still further object of the invention is the provision of a magnetic levitation system the levitation forces of which are independent of vehicle speed.

Another object of the present invention is the provision of a magnetic levitation system and a method of levitating vehicles wherein a portion of the system is a DC power transmission line thereby additionally permitting the collection of revenues for power distribution.

A further object of the invention is the provision of a levitation system for and a method of levitating vehicles in a transportation network wherein guideway rails comprise a DC power transmission line that functions both as part of the levitation system and as part of a power transmission system.

A still further object of the present invention is the provision of a magnetic levitation system and a method of levitating vehicles wherein the cost of levitation is economically favorable in comparison to the cost of levitating air cushion vehicles.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

FIG. 6 is a plot of the lateral restoring forces per unit length of vehicle as a function of lateral and vertical displacement;

FIGS. 7 and 8 are plots showing the influence of rail spacing and rail widths;

FIGS. 9 and 10 are plots showing the relation of lift forces and lateral forces as a function of rail width;

Figures 1, 2:
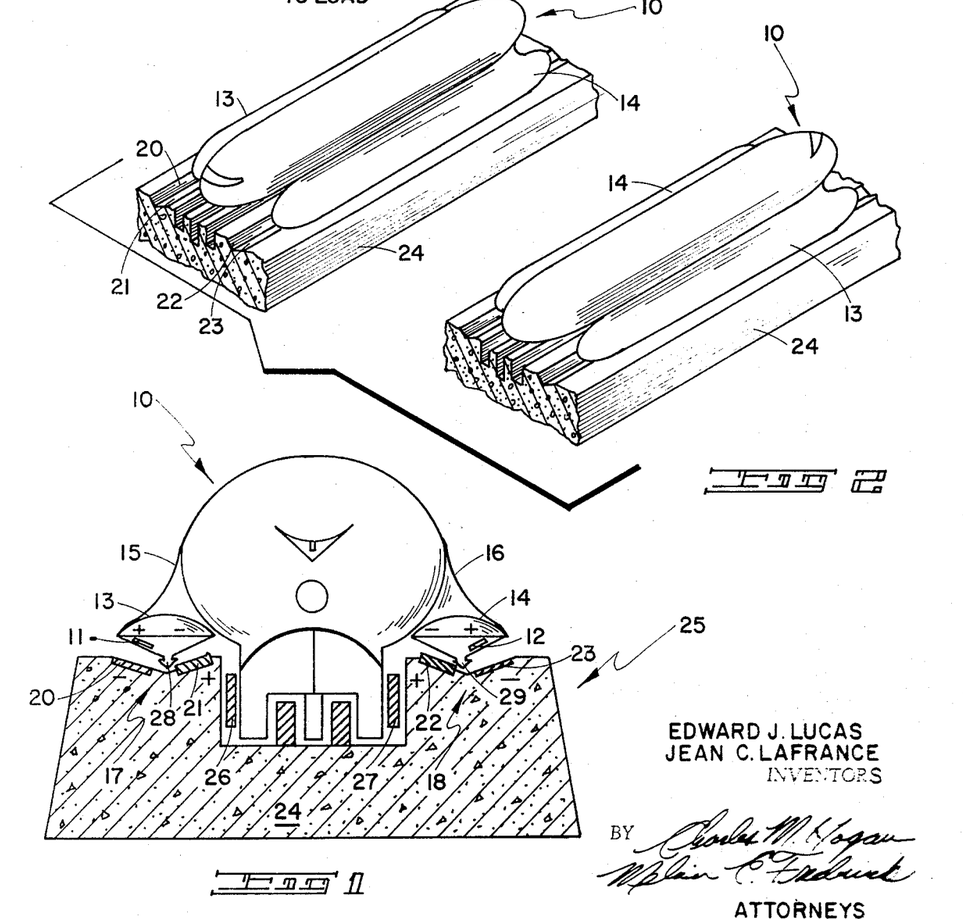
FIG. 1 is a front sectional view of a vehicle incorporating a levitation system in accordance with the invention.
FIG. 2 is a diagrammatic fragmentary view in perspective of vehicles incorporating a levitating system in accordance with the invention.

Directing attention now to FIG. 1, there is shown a configuration in accordance with the invention adapted to keep the magnet levitating fields away from the passenger compartment of the vehicle. A suspension system in accordance with the invention works on the principle that parallel wires carrying direct current flowing in opposite directions will repel each other with a force equal to $$F = \frac{\mu_0 I_1 \times I_2}{2R} \times (\text{length of wire}) \qquad (1)$$

where:

$\mu_0$ is the magnetic permeability of free space.
$I_1$ and $I_2$ are the currents carried by each wire; and
$R$ is the separation of the wires.

Figure 3:
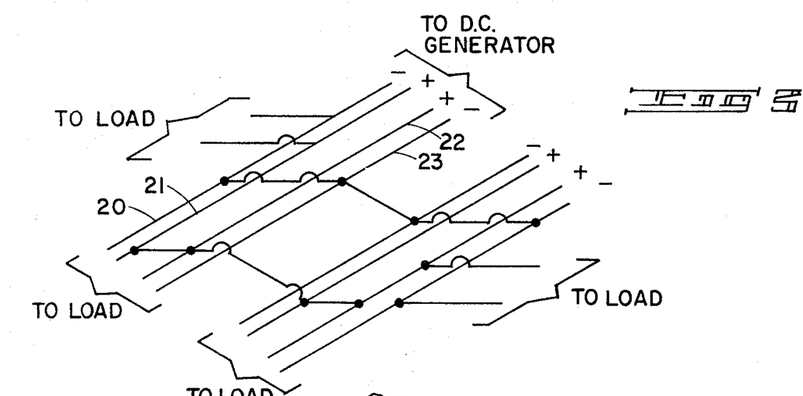
FIG. 3 is a fragmentary diagrammatic illustration of a rail system as a direct current transmission line in accordance with the invention.

To eliminate the necessity of superconducting levitation magnets from encircling the vehicle 10, two separate and distinct magnets 11 and 12 are enclosed in pontoons 13 and 14 attached to opposite sides of the vehicle 10. The pontoons 13 and 14 are preferably linked to the vehicle through articulated supports 15 and 16 that allow oscillation of the lifting magnets 11 and 12 to be damped out before they reach the vehicle proper. To make full use of the lifting capacity of the magnets two direct current (DC) transmission lines 17 and 18 each carrying oppositely directed currents in wires 20–21 and 22–23 are located on each side of the vehicle in the base or road bed 24 and directly underneath each levitation magnet. Each one-way track 25 as shown in FIG. 1 incorporates four distinct current-carrying lines 20, 21, 22, and 23. A complete two-way transportation in accordance with the embodiment as shown in FIG. 1 may have eight such lines, four positive lines and four negative lines as shown by way of example in FIG. 2 and FIG. 3.

Figure 4:
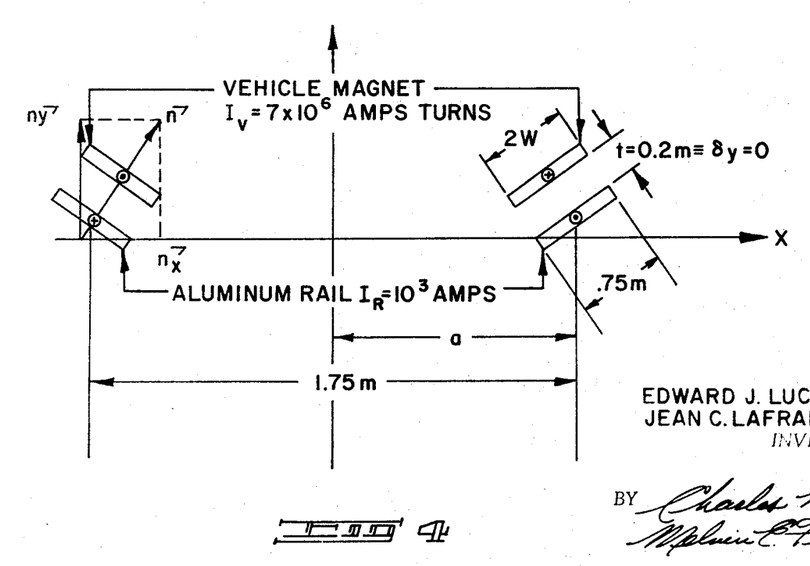
FIG. 4 is a diagrammatic illustration of one pontoon of the vehicle as shown in FIG. 1.

The configuration of the levitation system of one pontoon as shown in FIG. 1 is shown diagrammatically in greater detail in FIG. 4 to which reference is now made. The levitation magnet and the rails are angled with respect to the horizontal in order to provide lateral restoring forces. Because of the use of the rails as DC transmission lines and because in any event the rails carry direct current, the term "DC transmission line" is used interchangeably with the term "rail" or "rail system." The type of geometry as shown in FIG. 4 is necessary because all the forces of the system are repulsive and the active surfaces (rail and levitation magnet) produce forces only in the direction of their normal as shown in FIG. 4. For the case as shown in FIG. 4, the normal to the active surfaces of the rail and levitation magnet have both a "Y" component (lift) and an "X" component (restoring lateral force). Lift forces, lateral forces, and maximum field in the vehicle magnet were obtained for a number of lateral and vertical displacements and the currents listed in FIG. 4 are deemed to be those necessary under minimum performance conditions; i.e., maximum possible in the vehicle and minimum value in the rail. The indicated minimum rail or wire current was set at $10^3$ amperes because, for lower rail currents, the ratio of vehicle magnet weight to lift force is unattractive. FIGS. 5–10 give numerical values for the performance of a system in accordance with the invention. These values are based on a vehicle magnet current of $7 \times 10^6$ ampere turns, a rail current of 1,000 amperes for a four wire per track system, and a median flotation height of $t = 0.20$ meters. The median separation between vehicle magnet and current-carrying rail ($t = 0.2\text{m}$) is labelled $\delta_y = 0$; i.e., the vertical height from which vertical displacements are measured.

Figure 5:
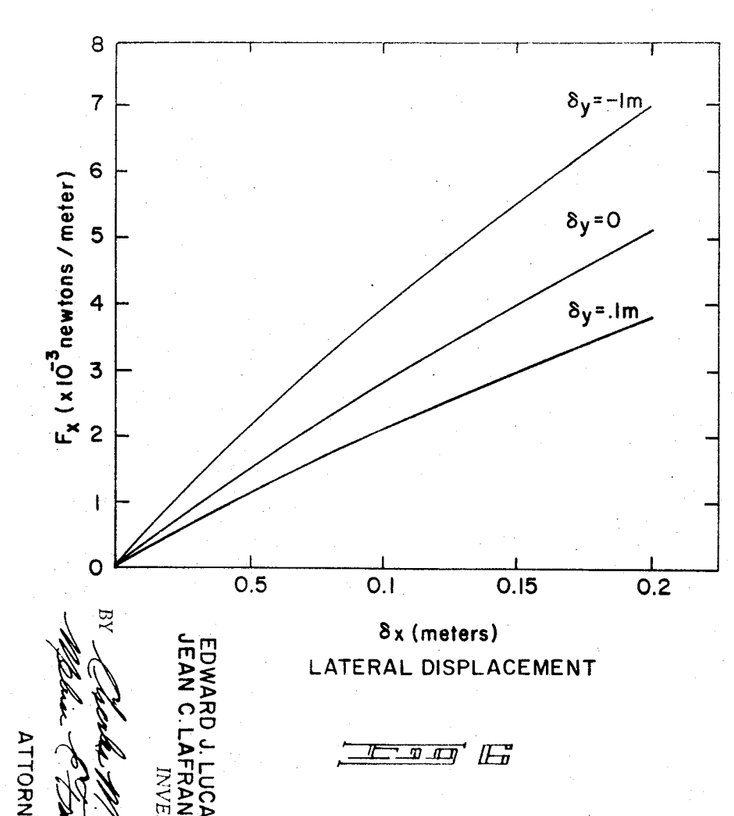
FIG. 5 is a plot of the lifting forces per unit vehicle length available as a function of lateral and vertical displacements from a mean value.

FIG. 5 shows a plot of lift forces per unit vehicle length available as a function of lateral ($\delta_x$) and vertical ($\delta_y$) displacements from the mean value ($\delta_y 0 = t = 0.2$ meters).

Also shown in FIG. 5 are the maximum anticipated weights per linear foot for a suitable vehicle. The aforementioned linear weights are extrapolated from present technology. Thus, the fuselage of the Lockheed C-5A weighs approximately 500 lbs./ft. of length and it is believed unlikely that vehicles for high speed ground transportation system would be much heavier than this. FIG. 5 shows that sufficient lift force is available and that the system is vertically stable; i.e., the lift forces increase as the vehicle moves down ($\delta_y$ goes negative). FIG. 5 also shows that a lateral displacement ($\delta_x$) will cause the vehicle to move down slightly.

FIG. 6 shows a plot of the lateral restoring forces per unit length of vehicle, as a function of lateral ($\delta_x$( and vertical ($\delta_y$) displacement. From FIG. 6 it will be seen that restoring forces are always positive and that the suspension is horizontally stable and that the lateral stabilizing forces are only about half the lift forces at best. The aforementioned lateral stabilizing forces and lift forces should be substantially sufficient for in-station performance and low speed travel. However, some form of lateral stabilization such as, for example, aerodynamics is recommended for use at high speed. A pair of controlling ram wings 26 and 27 may be provided as shown in FIG. 1.

The rail spacing and rail widths exercise a large influence on the interplay of the lift forces ($F_y$), lateral restoring forces ($F_x$), and maximum magnetic field $B_{mx}$ in the vehicle levitation magnet as shown in FIGS. 7–10. Since the current density in the superconducting levitation magnets is an inverse function of the magnetic field strength in the winding, the maximum magnetic field of the winding for purposes of this discussion is selected to be 6 webers/m².

FIGS. 7 and 8 show that for the maximum allowable $B_{mx}$ (6 webers/m²) the value of a rail inclination of 10° – 20° has little influence on the ratio of lift force ($F_y$) to restoring force ($F_x$). FIGS. 7 and 8 also show that a minimum rail spacing of $2a = 2x$ (0.75m) must be maintained if $B_{mx}$ is to be less than 6 webers/m². The ratio of lift force ($F_y$) to restoring forces ($F_x$) is relatively insensitive to rail spacing beyond the above-noted minimum half distance of 0.75m. This same criteria on the magnetic field intensity requires that the width of the rail be at least 0.75m for the currents considered in FIGS. 9 and 10. From FIGS. 9 and 10, it will be seen that the ratio of lift force ($F_y$) to lateral force ($F_x$) is relatively insensitive to rail width.

From FIGS. 5–10, it will be seen that the suspension system in accordance with the invention will furnish the required lift force and that the system is stable both vertically and horizontally for the displacements considered.

In the present discussion a minimum base current of 4,000 amperes (1,000 amperes per rail) in the transmission line or rail system has been selected. This base current is the minimum current that must be maintained in the lines. Accordingly, where the rail system is also a DC transmission line in accordance with the invention, that must feed a varying load, then this load variation must be accomplished through a current variation above the minimum 4,000 amperes of the transmission line. As current in the transmission line or rail system varies, the vehicle will tend to be displaced in the vertical direction relative to the rails. Where the line current variation with load is sufficiently small, then the vertical acceleration experienced by the passengers of the vehicle will be small and there will be no substantial need to compensate for it. However, if compensation for line current variation is needed, it may be accomplished electrically by changing vehicle magnet current through the use of vernier coils or mechanically through articulated joints between the vehicle and the magnet pontoons.

A levitation system in accordance with the invention is independent of speed and accordingly stopping vehicles at stations poses no special problem. However, where it is not economically attractive to run the DC transmission line portion of the rail system through all parts of the transportation network such as, for example, through stations and branch lines, these portions of the guideway that are not adaptable to power transmission useage may be operated at low voltage by their own high current power supplies at minimal power levels.

A DC transmission line and rail system as shown by way of example in FIG. 1 is substantially immune to all but the most severe of natural and man-made disasters. As any guideway on which high speed vehicles operate at speeds of 500 mph must be enclosed, the danger to life from the high voltage side of the DC transmission line is minimal. In the event of failure of one of the lifting pontoons or the levitation magnet disposed therein, the vehicle will drop on the rails. Accordingly, the lifting pontoon may be equipped with slightly protruding skids 28 and 29 as shown in FIG. 1 and with such skids in the event of a failure the vehicle will come to a controlled halt. Since the DC transmission line is preferably maintained at a high voltage, the skid and rail should be V-shaped to maintain the pontoon centered in the trough formed by the rail and thereby substantially reduce if not eliminate the danger of breaking through the insulation of the transmission line.

Figure 11:
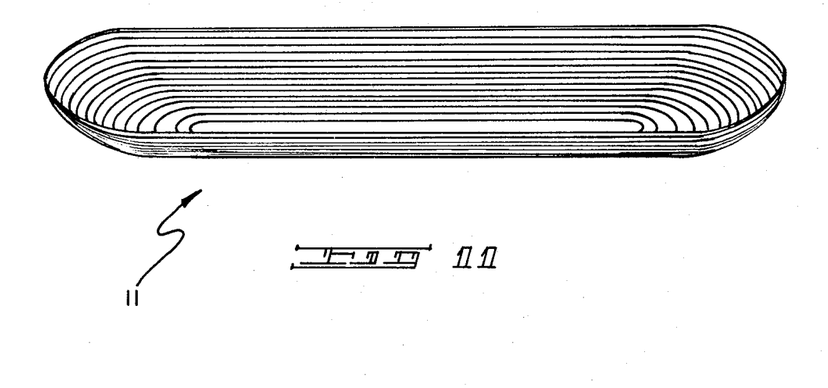
FIG. 11 is a perspective view of a vehicle magnet.

A magnetic levitation system in accordance with the invention requires the use of magnets mounted on the vehicle. The magnetic forces between the guideway and these magnets must provide the required lift as well as the forces for lateral stability. The general configuration of the magnets is shown in FIG. 1 which shows the cross section of both the magnet and the guideway rails carrying the DC lifting current. In order to provide this conductor configuration magnets may be provided which either run the full length of the vehicle or which occupy only a short section of each end of the vehicle. In either case, the magnets are of the saddle-type with two parallel conductors connected by crossovers at each end substantially as shown in FIG. 11.

Figure 12:
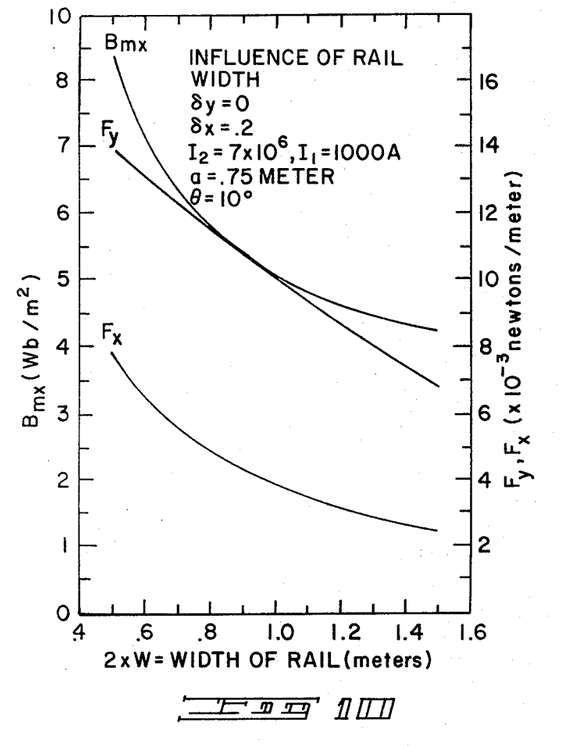
FIG. 12 is a plot showing the advantages of superconductors over other conductors.

For long duration application, superconductors offer decided cost advantages over conventionally cooled conductors for use in magnets. As shown in FIG. 12, superconductors also offer advantages in weight compared to conventional conductors, even when the latter are cryogenically cooled.

Superconductors as well as general conductors for the levitation magnet must transmit the vertical and lateral loads from the guideway to the vehicle. In addition, the magnet must support any internal magnetic loads. The basic difference between superconductive and conventional magnets consists of the liquid helium environment required for the superconducting magnet. The maintenance of this environment requires that each individual magnet be suitably housed in a Dewar to minimize heat leak into the superconducting magnet.

Since the suspension loads must be transmitted from the magnets to the vehicle structure, any structural members between the magnet and the vehicle will conduct heat from the vehicle into the magnet Dewar. In order to minimize this heat leak, the support members should be long and slender, which generally implies tension support. If a long member is loaded in compression, it will be subject to buckling. While it is possible to design for compressive failure before buckling takes place, this requires that the cross section have a large amount of inertia and this proves difficult to achieve in practice. Accordingly, from a purely heat leak point of view an all-tension structure is deemed to be the simplest. However, from a practical point of view, it is difficult to provide a tension support between the levitation magnet and the vehicle as shown in FIG. 1. The vehicle weight must actually hang from the magnets to allow tensile support and the proposed vehicle location as shown in FIG. 1 is above the magnets. Accordingly, a support structure in accordance with the invention must, therefore, be a combination of tensile and compressive members.

An important point concerning a magnetic suspension system in accordance with the invention concerns the ratio of magnet weight to lift force. For the minimum performance conditions set forth, hereinbefore, the levitation magnet must sustain $7 \times 10^6$ ampere turns at fields of 6 webers/m². It is not unreasonable for one to expect provision of a superconducting magnet weight to lift force ratio of the order of 15 percent or better if the highest possible magnet current densities and superconductive conductors of minimum weight are provided.

As an alternate to (or in combination with) providing maximum magnet current densities and minimum conductor weights, reduction of the magnet weight to lift force ratio may be provided by increasing that current flowing through the rails. As set forth hereinabove, a median clearance between the levitating magnet and its rail was selected to be 0.20m. Inclusion of the Dewar and rail insulation may be expected to leave a ground clearance of approximately 4 inches.

For the embodiment shown in FIG. 1, the tracks over which vehicles traveling in one direction ride, represents half of a DC transmission line (see FIG. 3) that provides a stiff asynchronous link between urban centers served by the transportation system. Such DC links are not uncommon and are presently used in Europe and Japan, are being built on the United States west coast and are contemplated for use between Montreal and New York.

DC transmission lines presently in use carry currents of the order of $10^3$ amperes at 200–750 kV. The use of such DC transmission lines with a guideway for a high speed ground transportation system in accordance with the invention as shown, for example, in FIG. 2, provides four one-way paths—two on each one-way track. Since the magnet-weight to vehicle-weight ratio for the case here considered becomes unattractive when the track current falls below about 1,000 amperes/track (i.e., 4,000 amperes line current) the current in the DC transmission line loop must be maintained at this level no matter what load is drawn from the transmission line comprising the rails.

One of the main functions of the high current DC transmission line is to provide levitation for high speed vehicles, hence, it will be helpful to compare the cost of levitating vehicles using a DC transmission line in accordance with the invention with what is believed to be its closest competitor—the ground effect vehicle. For purposes of comparison, a ground clearance of four inches set forth hereinabove is assumed to be the same for a ground effect vehicle, that 50 h. p. /ton represents a median figure of merit for the levitation of vehicles using air cushions, and that in the two systems each vehicle weighs 50 tons. Accordingly, 2,500 h. p. will be necessary to levitate a 50-ton air cushion vehicle.

Figures 12, 13:
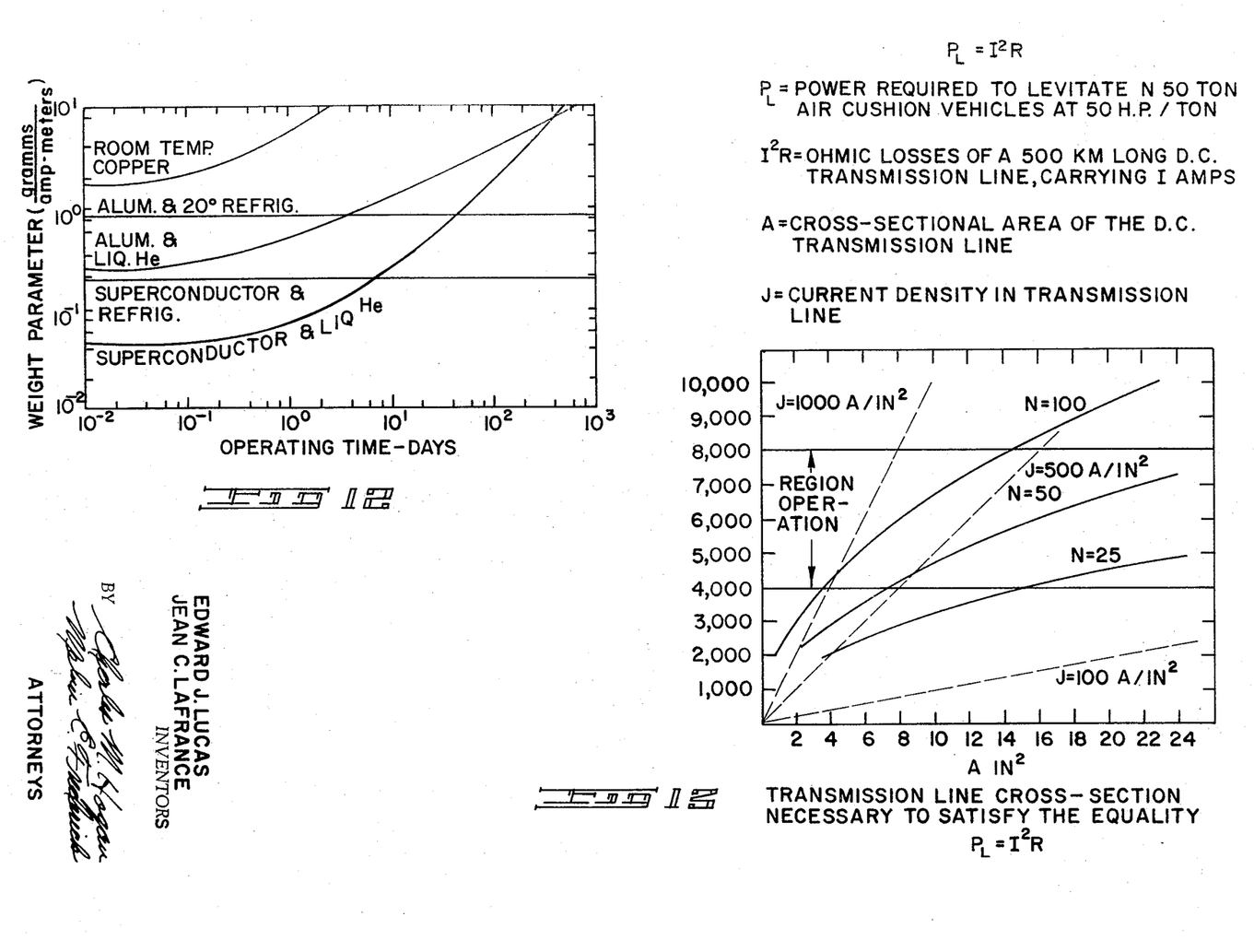
FIG. 13 is a plot of the solution of the equation $P_L = I^2 R$ for various values of transmission line current and number of vehicles levitated.

It is also assumed that one unit of power such as, for example, 1 KW necessary to levitate a vehicle costs the same amount of money whether it be produced by a turbine engine or by electrical means. It is further assumed that the largest part of the cost of levitating vehicles by magnetic means is in the ohmic losses of the transmission line. This is believed valid since the only costs considered for the air cushion vehicle are those of creating the air cushion. From the above assumptions one can write the equality $$P_L = I^2 R$$

where $P_L$ is the power required to levitate N vehicles at 50 h. p. /ton;

$N$ — the average number of 50-ton air cushion vehicles using a guideway in both directions 100 percent of the time;

$I^2 R$ is the ohmic losses of a 500 kilometer long DC transmission line carrying a current of I amperes.

Substitution for values of $P_L$, $I$ and $N$ permits solution of the above equation for the cross sectional area A of the DC transmission line that satisfies the equation. FIG. 13 is a plot of the solution of the equation set forth immediately hereinabove for various values of $I$ and $N$. Inspection of FIG. 13 shows that the cross sectional areas of an aluminum transmission line necessary to satisfy the aforementioned equation are modest. From the above, it may be determined that if only an average of 25 vehicles are operating on a network between, for example, Washington and Boston, the DC transmission line cross sectional area may be as small as 15.5 sq. inches (4.4 inches in diameter) before the ohmic losses due to the circulation of the minimum current of 4,000 amperes becomes equal to the power necessary to levitate the aforementioned 25 vehicles using an air cushion levitation system. If the more probable value of 100 vehicles is used, then the cross section of the aluminum transmission line may be as small as 3.75 sq. inches (2.2 inches in diameter) before the ohmic losses of the line carrying 4,000 amperes equal the power dissipation by an air cushion system using 100 vehicles. Stated differently, the DC transmission line in the last example may be operated with a current density as high as 1,000 amperes/sq. inch.

Utilization of the rail system as a DC transmission line as contemplated by the invention permits the collection of revenue from the sale of power and thereby provides a new and most unobvious advantage for a levitation system in accordance with the present invention.

Use of the rails as a DC transmission line requires that there be a high potential difference between rail pairs. Only one set of rails need to be insulated if the other rail is grounded. Accordingly, rubber with a breakdown voltage of between 1,000 and 2,000 volts per mil may be used as an insulator for the high voltage rail and may be molded right over the rail. Inasmuch as conventional DC transmission lines operate in the region of 100 to 1,000 kV, a layer of rubber insulation approximately 1 inch thick will insulate the high voltage side of each rail. The resistance to ground of a line so insulated is of the order of $10^8$ ohms/mile, giving a leakage current of the order of 1 ma/mile.

A rail system in accordance with the invention carrying 8,000 amperes will be able to deliver at least 4,000 amperes to a variable load. If the rail system is operated at 250 kV, then 1,000 megawatts of power is deliverable. The voltage of 250 kV is low for DC transmission lines, hence, if the higher value of 1,000 kV is provided, 4,000 megawatts may be carried by the rail system.

The value of total deliverable power available from a rail system in accordance with the invention determines at what current density the rail system may be operated. A 300 mile long transmission line in accordance with the invention operating at 750 amperes/sq. inch and carrying a current of 8,000 amperes will suffer an ohmic loss of $12 \times 10^7$ watts. This is substantially 12 percent of the 250 kV line capacity and may be considered too high a loss for such a line. However, if this line is operated at 100 amperes/sq. inch, the losses are only 1.6 percent of the line capacity. Accordingly, the aforementioned loss figures must be balanced against the advantages of using the rail system as the right-of-way for the high speed ground transportation system to arrive at what is an acceptable value for the losses.

Use of the rail system as a DC transmission line requires that operation of the line not interfere with the levitation of the vehicles. Accordingly, it is necessary that fault clearance in the terminal stations, power flow reversals, load variations and the like must not substantially affect the levitation of the vehicles. Power flow reversals on a DC transmission line occurs with an accompanying reversal of voltage because the current flow through the rectifier valves cannot reverse. This is particularly compatible with a levitation system in accordance with the invention. If a current flow reversal accompanied a power flow reversal in the transmission line, then the vehicles would be attracted to the rails and not repulsed by them. Fortunately, this does not occur. However, in view of the possibility of voltage reversal, both sides of the transmission line should be insulated.

If desired, compensation of load variation on the transmission line may be accomplished through the provision of vernier magnet coils on board the vehicles or through articulated suspension of the pontoons if these transmission line variations cause discomfort to passengers in the vehicles.

Figure 14:
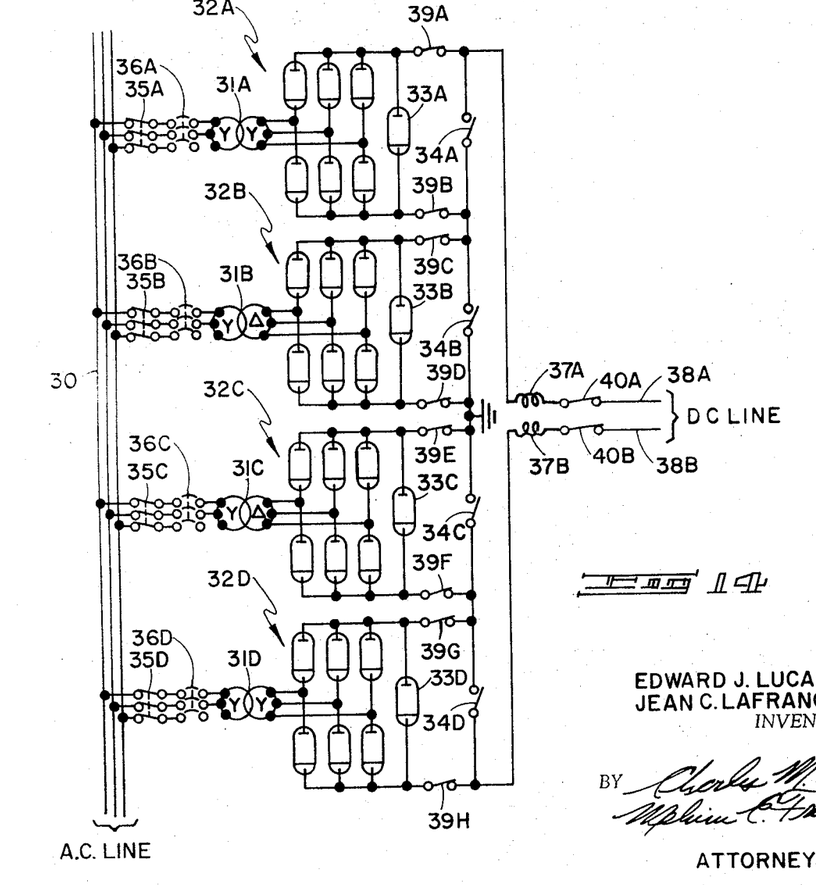
FIG. 14 is a block diagram of a typical converter station.

Reference is now made to FIG. 14 which is a diagrammatic representation of a typical converter station. As shown in FIG. 14, the AC line 30 is coupled to a plurality of separate converters 32A–32D each comprising a plurality of operating valves, via respectively transformers 31A–31D, circuit breakers 36A–36D, and isolator links 35A–35D. Bypass isolating links 34A–34D and bypass valves 33A–33D are connected across the DC terminals of respectively converters 32A–32D, with further isolating links 39A–39H connected between the aforementioned bypass valves 33A–33D and bypass isolating links 34A–34D. Smoothing reactors 37A and 37B and isolating links 40A and 40B are provided in the outgoing DC lines 38A and 38B.

Due to the series connection of the different units the method of cutting one unit in or out of operation differs from the conventional technique as previously noted. A bypass isolating link is connected across the DC terminals of each converter and other isolating links are interposed in both terminal conductors. A single converter may be shut down by the gridblocking of its ordinary valves and the simultaneous unblocking of its bypass valve. These operations may be activated by a conventional master controller. The two DC terminals of the given converter are thus short-circuited through its bypass valve, thereby enabling the current from the other converters to pass freely. Subsequently the bypass isolator may be closed and take over the current of the bypass valve. The further isolators in the two poles of the converter may now be open. The connections on the AC side can also be open either on the line side or the valve side of the transformer. The complete valve assembly may be grounded and made available for servicing. The startup of a single converter unit onto the energized line occurs in opposite sequence and the final step is the gridblocking of the bypass valve and unblocking of the six working valves.

As in an AC installation, the DC terminals must be protected against selective faults of station equipment. Such transient faults and arc backs in the valves form a short-circuit on the AC side which must be cleared by the grid blocking of all six valves of the affected converter. Such blocking occurs so quickly that the short-circuit will last for only one-half cycle and after 0.5 – 0.75 seconds normal operation is resumed. During the blocking period the current is transferred to the bypass valve so that the other converters of the pole can operate unaffected. The voltage, however, will dip in correspondence to the transient loss of one converter of the pole, but the current as described earlier will be maintained at approximately the same value.

From the above, it will now be seen that a continuous flow of current may be provided to the transmission line–rail system under all normal conditions. Under abnormal conditions the power flow to the rail system may be interrupted. This may happen under two conditions; catastrophic destruction of the guideway or a massive failure of the main generating station. Only the most severe of natural or man-made disturbances will destroy the heavy concrete guideway. In any event, this problem is common to all high speed ground transportation systems using guided vehicles. Failure of the main generating station is a problem that would affect levitation systems in accordance with the invention in a particular way. However, this may be obviated if a small low voltage generating station is coupled in parallel with the main generating plant. Accordingly, under normal operation this small generating plant may be shunted by a bypass valve in the manner shown in FIG. 14. Should the main generating station fail, then the backup station may be switched into the circuit in the same way as a converter unit is switched back into the circuit after a fault-clearing operation It should also be noted that under all fault-clearing operations mentioned hereinabove, DC power breakers are not needed. In principle, a DC power breaker capable of interrupting a heavy current will be required only when two solidly paralleled DC circuits are to be separated, which requirement does not arise.

Figure 15:
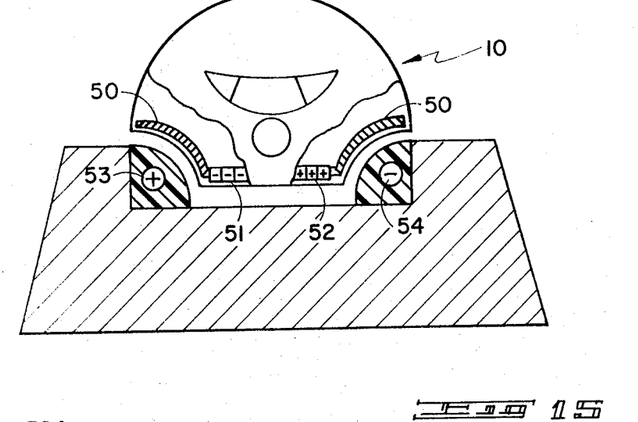
FIG. 15 is a front view of a modification of the invention.

FIG. 15 shows a modification of the invention wherein the vehicle 10 is provided with a single saddle coil magnet 50 and oppositely disposed superconductive diamagnetic panels 51 and 52.

The parallel portions of the conductors forming the saddle coil 50 (see FIG. 1) and the diamagnetic panels 51 and 52 are disposed along the lower side of the vehicle substantially as shown and described in connection with FIG. 4. In this case, the transmission line-rail system as well as the magnet panels are superconductive to provide minimum losses and maximum levitation forces. The diamagnetic panels 51 and 52 exclude flux and hence "float" on the field produced by the DC current in the superconducting DC transmission lines 53 and 54. The saddle coil magnet 50 functions as a vernier coil and by controlling the current flowing therein, adjustment of the height of the vehicle over the transmission line may be achieved. Further, if desired, the diamagnetic panel-vernier coil configuration may be replaced by a single saddle coil magnet having a relationship and configuration with respect to the transmission line substantially as shown in FIG. 4, thereby eliminating the necessity of pontoons as shown in FIG 1.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims:

We claim:

1. In apparatus for levitating a vehicle forming part of a tracked ground transportation system including two spaced rails means, the combination comprising:
   a. a direct current transmission system including a two wire transmission line defining at least in part the said rails means of said transportation system, said wires are of opposite polarity, each said wire comprises two discrete conductors and each said rail comprises one of said conductors of each said wire, and each said conductor is planar in its width dimension and the conductors comprising each said rail are downwardly inclined toward each other in a generally V-shaped configuration;
   b. first means for continuously supplying direct current power to said transmission line defining said rails means;
   c. second means for coupling power from said transmission line to a load, said second means being remote from said first means, said rails means and said vehicle;
   d. third means for controlling the amount of current flowing through said transmission line to maintain said current flow greater than a predetermined minimum amount; and
   e. magnet means fixedly disposed in said vehicle and adjacent said transmission line, said magnet means providing a magnetic field adjacent each said wire of said transmission line for levitating said vehicle over said transmission line, said magnetic field adjacent each wire being at an angle to the horizontal and opposed to the magnetic field surrounding each said wire whereby verticle and horizontal forces resulting from said magnetic fields are applied to said vehicle, said magnet means comprising a superconducting magnet coil adjacent each said wire having a saddle shape, each said magnet coil providing at least about $7 \times 10^6$ ampere turns.

2. The combination as defined in 1 wherein each said saddle coil includes oppositely disposed side portions spaced one from another and connected at their ends by cross over portions, said side portions of each said coil being substantially planar and parallel to the planar dimension of said conductors adjacent thereto.

* * * * *